United States Patent [19]

Weghaupt

[11] 4,060,743
[45] Nov. 29, 1977

[54] SUPERCONDUCTIVE EXCITER WINDING FOR THE ROTOR OF A TURBOGENERATOR AND METHOD OF PRODUCTION

[75] Inventor: Erich Weghaupt, Mulheim (Ruhr), Germany

[73] Assignee: Kraftwerk Union Aktiengesellschaft, Mulheim (Ruhr), Germany

[21] Appl. No.: 583,158

[22] Filed: June 2, 1975

[30] Foreign Application Priority Data

Jan. 28, 1975 Germany .............................. 2503428

[51] Int. Cl.² ............................................. H02K 9/10
[52] U.S. Cl. .................................... 310/52; 310/10; 310/214
[58] Field of Search ................ 310/10, 40, 52, 219, 310/86

[56] References Cited

U.S. PATENT DOCUMENTS

| | | | |
|---|---|---|---|
| 3,517,231 | 6/1970 | Massar | 310/52 |
| 3,679,920 | 7/1972 | MacNab et al. | 310/10 |
| 3,745,389 | 7/1973 | Lorch | 310/52 |
| 3,934,163 | 1/1976 | Mailfert | 310/10 |
| 3,942,053 | 3/1976 | Abolins et al. | 310/52 |

*Primary Examiner*—Donovan F. Duggan
*Attorney, Agent, or Firm*—Herbert L. Lerner

[57] ABSTRACT

In a turbogenerator rotor, the combination of a superconductive exciter winding formed of a multiplicity of individual windings and a winding support cylinder wherein the superconductive exciter winding is securely received, the support cylinder being formed with axially extending slots uniformly distributed about the periphery thereof, the slots having respectively equal dimensions, and having a content of respectively equal dimension and equal weight, the content of the slots including the superconductive exciter winding embedded therein; and method of production.

9 Claims, 4 Drawing Figures

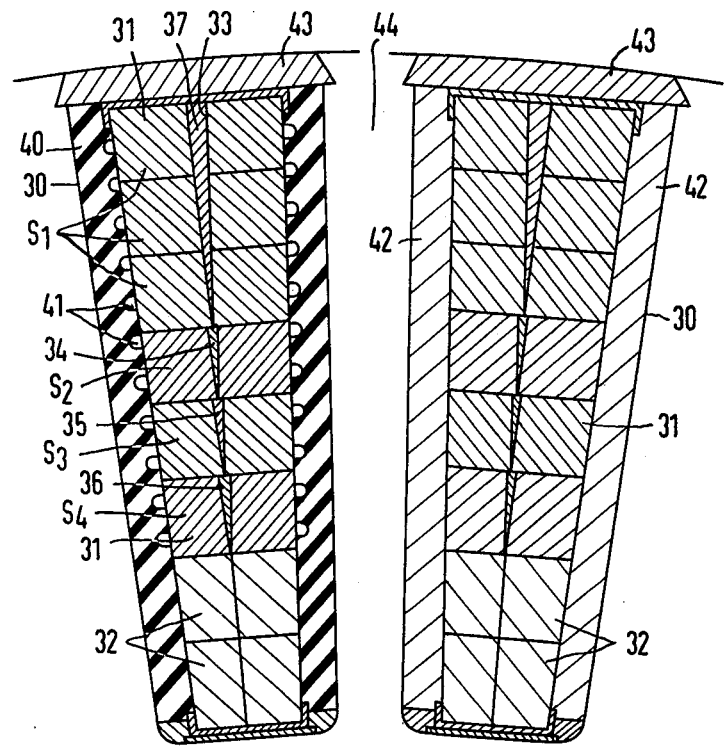

SUPERCONDUCTIVE EXCITER WINDING FOR THE ROTOR OF A TURBOGENERATOR AND METHOD OF PRODUCTION

The invention relates to a superconductive exciter winding for the rotor of a turbogenerator that is formed of a multiplicity of individual turns, which are disposed in a support cylinder for the windings; and a method of production thereof.

Such an exciter winding has been known heretofore from U.S. Pat. No. 3,679,920; according thereto, the winding is wound in slots that are formed in the outer surface of the support cylinder, and is retained in the slots by holder sleeves formed of non-magnetic material. The cross-section of the conductor of the winding and of the slots varies over the periphery of the rotor in such a manner that a sinusoidal distribution of magnetic flux results therefrom. Cooling of the winding is effected by means of separate cooling tubes located on the inner side of the support cylinder so that only indirect cooling is thereby possible.

However, such a winding disposed in slots of varying dimensions and having respective varying winding cross-sections causes an elliptical deformation of the rotor during operation thereof, which is due to the centrifugal forces that are produced. This elliptical deformation can then produce disturbances. Furthermore, the installation and the secure support or retention of a superconductive exciter winding are very difficult to effect, because the superconductors are formed of a multiplicity of hair-thin filaments formed of a special alloy, which are embedded in a matrix, such as of copper, for example. In contrast with normal conductors, because of the high current loading, high current forces act upon the superconductor in addition to the centrifugal forces and must be absorbed without damage by the individual conductors of the winding. Moreover, the winding of a superconductive rotor must be formed of as many continuously wound turns as possible to reduce the number of soldered joints. Consequently, the winding must be wound directly in the support cylinder without prior processing. Because of the compulsion for direct winding within the support cylinder, the manufacturing accuracy and, accordingly, the exact and play-free attachment of the windings or coils naturally suffer as a result.

It is consequently an object of the invention of the instant application to provide a superconductive exciter winding which can be produced in a relatively simple manner and retained free of play within the slots formed in the support cylinder, and wherein a deformation of the rotor does not occur during operation due to varying centrifugal forces.

With the foregoing and other objects in view, there is provided, in accordance with the invention, in a turbogenerator rotor, the combination of a superconductive exciter winding formed of a multiplicity of individual windings and a winding support cylinder wherein the superconductive exciter winding is securely received, the support cylinder being formed with axially extending slots uniformly distributed about the periphery thereof, the slots having respectively equal dimension and equal weight, the content of the slots including the superconductive exciter winding embedded therein.

In accordance with another feature of the invention, the respective content of a plurality of the slots is formed partly of superconductive conductors and partly of copper conductors.

In accordance with a further feature of the invention, the proportion of superconductors to copper conductors in the respective slots increases with increasing proximity of the respective slots to a neutral zone of the exciter winding.

Through the foregoing structural features, a fully rotationally symmetrical, centrifugal force layer is attained which prevents elliptical deformation of the winding support.

To maintain as few soldering joints as possible in the winding embedded in the substantially conically converging slots, it is furthermore advantageous, and in accordance with an additional feature of the invention to provide that the individual windings of the superconductive exciter winding each include a coil disposed in one of the slots, the coil being formed of a plurality of member coils or partial coils, each including a plurality of conductors having a profile of equal cross-sectional area, the profile varying from partial coil to partial coil.

For direct cooling of the exciter conductors, it is further advantageous and in accordance with yet another feature of the invention, to provide insulating plates disposed between the conductors of the superconductive exciter windings in the slots and the exciter walls of the slots, the insulating plates being formed with cooling grooves in the surface thereof facing toward the exciter winding conductors, the cooling grooves being open toward the exciter winding conductors.

In accordance with an added feature of the invention, the slots are spaced peripherally about the support cylinder and are defined by respective teeth located therebetween, and slot wedges, are provided for closing the slots, the slot wedges and the teeth forming a force-locking arch along the periphery of the support cylinder.

To hold the winding properly, in accordance with yet another feature of the invention, a bracing cylinder is disposed around and in shrink-fitting engagement with the support cylinder and extending over the slots covered by the slot wedges and along the entire axial length of the support cylinder.

To produce a firm and rigid union or bonding of the conductors, the individual windings are received in the slots, respectively, and secured by the slot wedges in the slots, the individual windings being embedded in vacuum-impregnated and thermally hardened resin.

In accordance with the method of producing the foregoing combination of a superconductive exciter winding formed of a multiplicity of individual windings and a winding support cylinder wherein the superconductive exciter winding is securely received, the individual windings are wound, respectively, into the axially extending slots formed in the support cylinder and uniformly distributed about the periphery thereof, and the individual windings are impregnated with resin after replacing the insulation plates formed with cooling grooves by smooth steel plates having the same dimensions as those of the insulation plates and having surfaces impregnated with resin-repelling means.

Other features which are considered as characteristic for the invention are set forth in the appended claims.

Although the invention is illustrated and described herein as embodied in a superconductive exciter winding for the rotor of a turbogenerator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is an enlarged cross-sectional view of one of the slots formed in the support cylinder of FIG. 1, the seat being fully wound around and impregnated with impregnating resin; and FIG. 4 is a view similar to that of FIG. 3 of a slot wound around by an exciter winding but prior to being impregnated with impregnating resin.

Figure 1:
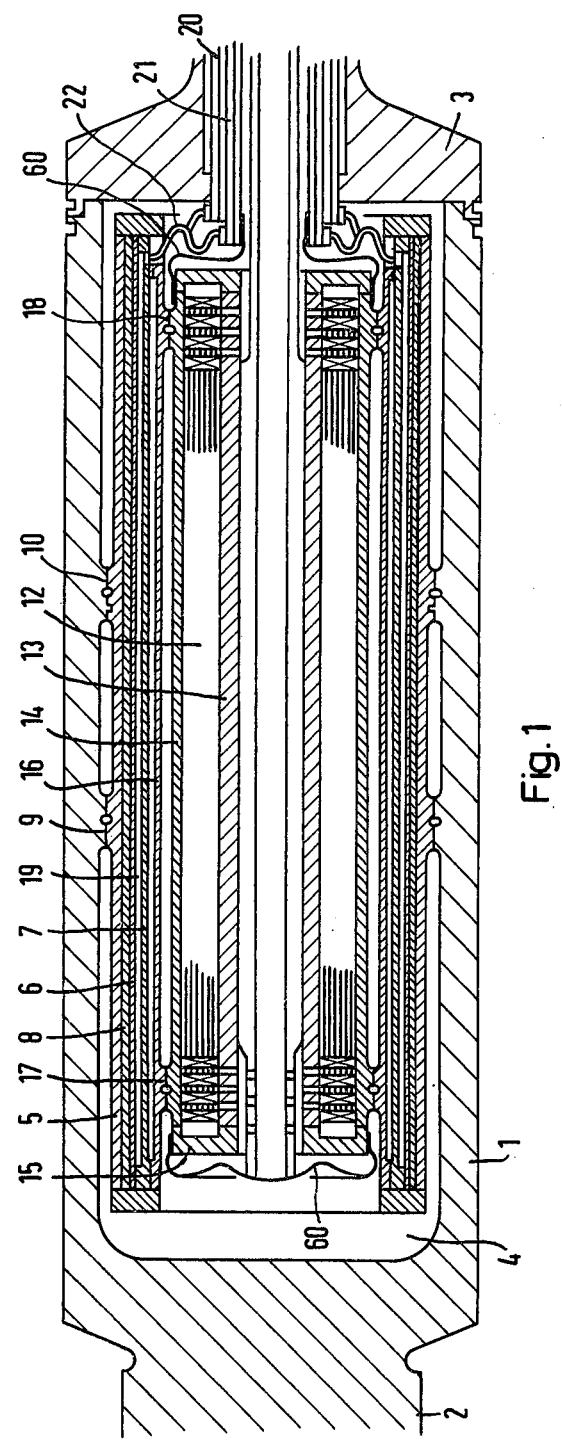
FIG. 1 is a longitudinal sectional view of the rotor of a turbogenerator having a superconductive exciter winding according to the invention.
Figure 2:
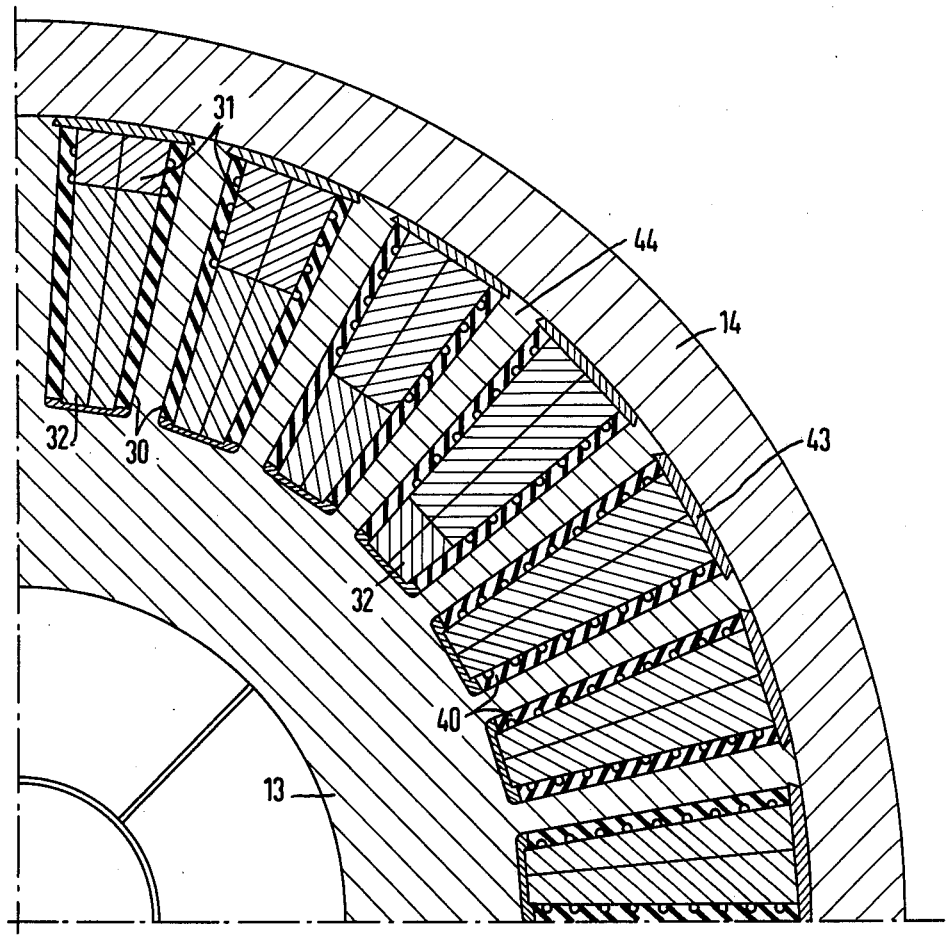
FIG. 2 is an enlarged cross-sectional view of FIG. 1 showing a quarter sector of the support cylinder wherein the exciter winding is received.

Referring now to the drawings and first, particularly, to FIG. 1 thereof, there is shown an outer rotor body 1 formed as a hollow cylinder and closed at the end 2 thereof facing the turbine and flanged vacuum-tightly to a non-illustrated exciter shaft by a further non-illustrated coupling at the end 3 of the rotor body 1 facing the exciter. The rotor body 1 is formed with an inner chamber 4 that is evacuated. In the inner chamber 4, in radial direction from the outside to the inside thereof, three concentric steel cylinders 5, 6 and 7 with an interposed damper winding 8 are disposed. The three steel cylinders 5, 6 and 7 with the damper winding 8 are connected to the outer rotor body 1 through articulating points 9 and 10 which have a high thermal resistance. The winding 12 proper, as can be seen particularly from FIG. 2, is imbedded in slots or recesses formed at the outer periphery of a winding support cylinder 13, over which a bracing cylinder 14 is press-fitted. Both cylinders 13 and 14 are force-lockingly connected to each other at their ends through a cover 15 and closed off by caps 60, so that a closed winding space is provided which is separated from the evacuated inner chamber 4.

The cylinders 13 and 14 containing the winding are connected through a spring cylinder 16 and appropriate articulating points 17 and 18 to the three cylinders 5, 6 and 7. The damper formed of the cylinders 5, 6 and 7 and the damper winding 8 also fulfills the function of a cold shield. All of the gaps or spaces between the cylinders 5, 6, 7 and 16 are evacuated.

The damper winding 8 is cooled through cooling channels 19, which are traversed by coolant supplied through concentric channels 20 and 21 and through connecting hoses 22.

As can be seen from FIG. 2, the support cylinder 13 is formed with a distribution of slots spaced-apart uniformly at the periphery thereof. All of the slots 30 are of equal dimensions and contain a filling of equal weight. In accordance with the required course of the magnetic flux, all slots or recesses, however, are not fully filled with superconductive conductors, but rather, the number of the superconductors 31 in each slot increases towards the right-hand side of FIG. 2 to a neutral zone. Slots not filled with superconductors 31 are filled with ordinary copper conductors 32 acting as filling conductors. Thereby, a fully rotationally symmetrical, centrifugal-force layer is attained which prevents elliptic deformation of the winding support during operation. The support or retention proper for the windings within the slots or recesses 30 is effected by a bracing cylinder 14, which is shrink-fitted on the support cylinder 13 and the closed slots or recesses 30.

An accurate illustration of a filled slot or recess is provided in FIG. 3. The slot 30 is given a conical shape for better electrial utilization. All of the conductors 31 have approximately equal cross-sectional areas. The dimensions of the member conductors are made as uniform as possible. In view of the conicity of the slot, different profiles for the member conductors must be selected in order to achieve a good filling of the slot. In order, however, to maintain as few solder joints as possible, and, in order to be able to wind as many conductors as possible continuously into the slot, four member coils of different respective profiles have been selected in the illustrated embodiment of FIG. 3. The uppermost three layers of member conductors form a partial or member coil $S_1$, and the respective radially inwardly succeeding layers form partial or member coils $S_2$ to $S_4$ with respectively uniform profile of the member conductors. As the result of the uniformity of the profile over a given slot height, sword- or wedge-like intermediate spaces 33 to 36 are formed between the two rows of member conductors and can be filled with insulation 37. In the illustrated subdivision of the profiles, for one slot, only a few solder joints are required within a coil at the transition points or locations of the member or partial coils. The illustrated slot 1 is not, however, filled completely with superconductors 31, but rather, at the bottom of the slot, four copper conductors 32, as shown in FIG. 3, are inserted.

Cooling of the winding is effected at the lateral surfaces of the conductors. To that end, insulating plates 40 are inserted between the conductors 31 and the slot walls 30. The insulating plates 40 are formed with open cooling grooves 41 on the surfaces thereof facing the superconductors 31. In the aforedescribed and illustrated embodiment, the cooling grooves extend in axial direction; but guidance of the coolant in radial or any other arbitrary direction is also conceivable. Liquid helium is guided through these cooling grooves 41, so that the conductors are cooled directly. Cooling in the region of the copper conductors is not required, however, so that in that region, the insulating plates 40 do not have any cooling grooves.

As has already been noted hereinbefore, the winding must tightly fit within the slots completely free of play. If this condition should not be met, damage to the superconductors and, in the extreme case, even failure thereof can result therefrom. In order to meet these conditions the following measures pertaining to construction and manufacturing techniques are explained with respect to the winding and impregnation of a slot.

As can be seen from FIG. 4, for the purpose of winding the conductors inside the slots, steel plates 42 are inserted into the slots instead of the insulating plates 40 that are formed with cooling channels, the steel plates 42 having the same dimensions as those of the insulating plates 40, but formed with no cooling channels, however. These steel plates 42 receive a surface treatment in the form of a protective coating, which prevents adhering and sticking of the resin thereto during the impregnation of the winding. The copper conductors 32 and the member superconductors 31 are individually wound into the slot 30 from the bottom toward the top thereof and soldered. Upon completion of the winding operation, the slots 30 are filled, as required, with filling strips and tightly closed off with narrow steel wedges 43. These wedges 43 have no carrying or support function but serve primarily for firmly retaining the winding upon the insertion or installation thereof. The bracing per se of the winding is effected during operation by the bracing cylinder 14 according to FIG. 2.

The fully wound and wedged support cylinder 13 is then impregnated with epoxy resin in a vacuum impregnation plant to the exclusion of air, and is heat-hardened. Thereby a firm baked-together union of the coils is produced. Moreover, any gaps remaining yet after the winding operation is completed are completely filled with resin. Thereby, complete freedom from play of the member conductors relative to one another as well as of the complete coil within the slot or recess is achieved.

The coil winding heads can also be included in this impregnating and hardening process, the hollow spaces therein being filled with shaped members beforehand.

Following the impregnation and hardening process the wedges 43 are again removed. In connection therewith, the steelplates 42 are removed and the insulating plates 40, that are formed with cooling channels or grooves 41 and that can, for example, be formed of a glass silk resinous web, are substituted therefore readily and free of play. Then the wedges 43 are again driven tightly in. After the slots have been closed, the support cylinder 13 together with the slot wedges 43 is turned to the tolerance on fit and the aforementioned bracing cylinder 14 is shrink-fitted thereon.

With the aforedescribed winding support, which is made up of the support cylinder 13 and the bracing cylinder 14, the teeth 44 between the slots or recesses can be made relatively thin so that a relatively large slot volume is possible. This construction ensures that the high centrifugal forces of the coils occurring during operation and during centrifugal rotation or spinning are absorbed predominantly by the bracing cylinder 14, which is advantageously, smoothly and stably formed, while the teeth 44 between the slots and the narrow wedges 43 experience only a relatively slight stress.

In addition to the radial forces, no inconsiderable tangential current-forces occur, which stress the teeth 44 of the carrier 13 in bending. The teeth 44 between the slots must not be permitted, on the other hand, under any circumstances to abut the adjacent or neighboring coil and to press against the superconductors. Therefore, the slot wedges 43 that are formed of steel have the additional task of forming a radially outer counter-bearing for the teeth 44. To fulfill this task, these wedges 43 must be fitted in such a manner that the slot teeth 44 and the wedges 43 form a force-locking arch over the periphery.

It is claimed:

1. In a turbogenerator rotor having a hollow cylindrical body, the combination of winding support means disposed within the hollow cylindrical rotor body for supporting a superconductive winding, a plurality of intermediate cylinders comprising vibration damping and cold shielding cylinders disposed around said winding support means intermediate said winding support means and the cylindrical body of the rotor, said winding support means, being force-lockingly connected to the cylindrical rotor body through axially transposed articulating points on said intermediate cylinders yet being permitted resiliency thereat in radial direction, said winding support means comprising a support cylinder disposed within said intermediate cylinders and formed with axially extending slots uniformly distributed about the outer periphery thereof, said slots having respectively equal dimensions and having a content of respectively equal dimension and equal weight consisting of conductors formed at least partly of copper or superconductive material or both thereof, slot wedges covering said slots respectively at the outer peripheral surface of said support cylinder, and a bracing cylinder having a length equal to that of said support cylinder being coaxially disposed thereon in shrink fitting engagement therewith.

2. The combination according to claim 1, wherein the respective content of a plurality of said slots is formed partly of superconductors and partly of copper conductors.

3. The combination according to claim 2 wherein the proportion of superconductors to copper conductors in the respective slots increases with increasing proximity of the respective slots to a neutral zone of the exciter winding.

4. The combination according to claim 1 wherein the individual windings of the superconductive exciter winding, each includes a coil disposed in one of said slots, said coil being formed of a plurality of partial coils, each including a plurality of conductors having a profile of equal cross-sectional area, said profile varying from partial coil to partial coil.

5. The combination according to claim 1 wherein each of said slots is defined by lateral walls, and including, between said lateral walls, respectively, and the superconductive exciter winding embedded in the respective slot, an insulation plate having cooling grooves formed in the surface thereof which faces toward the exciter winding, said cooling grooves being open toward said exciter winding.

6. The combination according to claim 1 wherein said slots are spaced peripherally about said support cylinder and are defined by respective teeth located therebetween, said slot wedges and said teeth forming a force-locking arch along the periphery of said support cylinder.

7. The combination according to claim 6 wherein said bracing cylinder disposed around and in shrink-fitting engagement with said support cylinder extends over said slots covered by said slot wedges and along the entire axial length of said support cylinder.

8. The combination according to claim 6 wherein the individual windings are received in said slots, respectively, and are secured by said slot wedges in said slots, said individual windings being embedded in vacuum-impregnated and thermally hardened resin.

9. Method of producing the combination of a superconductive exciter winding formed of a multiplicity of individual windings and a winding support cylinder wherein the superconductive exciter winding is securely received according to claim 5, which comprises winding the individual windings respectively into the axially extending slots formed in the support cylinder and uniformly distributed about the periphery thereof, and impregnating the individual windings with resin after replacing the insulation plates formed with cooling grooves by smooth steel plates having the same dimensions as those of the insulation plates and having surfaces impregnated with resin-repelling means.

* * * * *